United States Patent [19]
True

[11] Patent Number: 4,789,221
[45] Date of Patent: Dec. 6, 1988

[54] LIGHT VALVE PROJECTOR APPARATUS HAVING INCREASED LIGHT EFFICIENCY

[75] Inventor: Thomas T. True, Camillus, N.Y.

[73] Assignee: General Electric Company, Philadelphia, Pa.

[21] Appl. No.: 48,109

[22] Filed: May 8, 1987

[51] Int. Cl.4 ...................... G02B 27/42; G02B 27/00; H04N 9/31

[52] U.S. Cl. .......................... 350/162.12; 350/162.24; 350/167; 358/62

[58] Field of Search ...................... 350/162.12, 162.17, 350/162.2, 162.24, 167; 358/62

[56] References Cited

U.S. PATENT DOCUMENTS

| | | | |
|---|---|---|---|
| 3,265,811 | 8/1966 | Ellis | 358/62 |
| 3,290,436 | 12/1966 | Good et al. | 358/62 |
| 3,305,630 | 2/1967 | Good et al. | 358/62 |
| 3,305,631 | 2/1967 | Good et al. | 358/62 |
| 3,308,230 | 3/1967 | Good et al. | 358/62 |
| 3,330,908 | 7/1967 | Good et al. | 358/233 |
| 3,367,226 | 2/1968 | Vanderlaan | 350/167 UX |
| 3,429,996 | 2/1969 | Graser, Jr. et al. | 358/233 |
| 3,437,746 | 4/1969 | Good et al. | 358/62 |
| 3,538,249 | 11/1970 | Graser, Jr. et al. | 358/233 |
| 3,592,529 | 7/1971 | Juhlin, Jr. et al. | 350/162.17 |
| 4,305,099 | 12/1981 | True et al. | 358/231 |

OTHER PUBLICATIONS

6.2: High Performance Video Projector Using 2 Oil Film Light Valves by T. T. True General Electric Co., Syracuse, N.Y. distributed in Apr. 1987.

Primary Examiner—John K. Corbin
Assistant Examiner—David J. Edmondson
Attorney, Agent, or Firm—Stephen A. Young; Paul Checkovich

[57] ABSTRACT

A multiple light valve (MLV) projector apparatus for producing a color display includes two separate light valves of the Schlieren dark field type. One of the light valves produces a first primary color, for example green, and the other light valve produces two other primary colors, for example red and blue. In such an apparatus the output brightness is usually limited by the red light output. An improved input (and complementary output) mask is described which optimizes the transmission of the first, second and third diffraction orders through the slots in the portion of the input mask which transmits red light. Such an optimization provides a substantial increase in red light output compared to a conventional input mask. Red transmitting slots extending in a first direction are asymmetrically disposed with respect to corresponding lenticules that extend in the first direction, while slots extending in a second direction may be symmetrically disposed with respect to corresponding lenticules that extend in the second direction. The first and second direction may be orthogonal to each other.

16 Claims, 4 Drawing Sheets

LIGHT VALVE PROJECTOR APPARATUS HAVING INCREASED LIGHT EFFICIENCY

BACKGROUND OF INVENTION

The present invention generally relates to a light valve projector of the Schlieren dark field type and more particularly to an apparatus utilizing two light valves one of which has an optical pupil comprising an input mask having an improved light-transmissive slot configuration which in conjunction with the corresponding output mask fully utilizes the slots which are available in the input and output masks.

The general principles and mechanisms of a light valve projector utilizing Schlieren projection lenses are described for example in U.S. Pat. No. 3,437,746 issued to Good et al., on Apr. 8, 1969 which is incorporated by reference herein for the purpose of disclosure. Such a system utilizes a single light valve to project color images using a common area of a viscous light modulating medium, or control layer, and a common electron beam for the production of deformations in the control layer for simultaneously controlling the transmission therethrough, point by point, of the primary color components in a beam of light in response to a plurality of simultaneously occurring electrical signals.

In a light valve projector system the input bar plate, or mask, passes filtered light focused onto the slots of the input mask by a lenticular lens system composed of arrays of lenslets. The output bar plate or mask blocks or passes light rays according to whether they have been diffracted by diffraction gratings written on the control layer by the electron beam. The configuration of the input and output masks is complementary; that is, opaque areas of the output mask are aligned with slot (i.e., transparent areas) of the input mask while slots of the output mask are aligned with opaque areas of the input mask. The configuration of the input mask dictates the configuration of the color filter plate and the lenticular lens system.

A single light valve full color projector has a typical modulated light output of about 1200 lumens and is acceptable for many applications. However, there are some applications such as simulator displays, arena displays, and for large audience screens over 20 foot wide where higher light output and resolution are required. Multiple light valve (MLV) projectors utilizing two light valves, one to produce green light and a second, to produce red and blue light (magenta) are used for such applications. Such MLV projectors are capable of achieving a 2000 lumen light output but not with a consistent, comfortable margin. Variations in light source, dichroic color and efficiency, light valve efficiency, and the scanning rate determine whether or not an output of 2000 lumens is achieved. An MLV projector is described in U.S. Pat. No. 3,265,811 issued to Ellis on Aug. 9, 1966 which is incorporated by reference herein for disclosure purpose.

A two color, blue and red, light valve is shown in FIG. 1. Briefly, with reference to FIG. 1, the slots of the input mask 20 are arranged such that the horizontally oriented slots, referred to as "red slots", are in the center of the Plate and the vertically oriented slots, referred to as "blue slots", are located above and below the red slots. As mentioned, the output mask 48 is complementary to the input mask; i.e., the opaque bars in the output mask are aligned with the slots in the input mask 20. An enlarged view of the prior art input mask 20 is shown in FIG. 2 where, for purposes of illustration, a portion of the input mask 20 is shown broken away to reveal arrays of lenslets or lenticules 19 of the lenticular lens system 16. 18. In this type of input mask, a horizontal slot 22 is aligned with every row of lenticules and the adjacent slots 22 are separated by an opaque horizontal bar 24.

The configuration shown in FIG. 2, having five horizontal slots 22 occupying a first region or central portion of the input mask 20, and seven vertical slots 30, separated by opaque bars 32, located in a second region comprising portions above and below the central portion, is a compromise design for highest possible resolution rather than highest light output. The horizontal slots 22 and the vertical slot 30 are arranged on a one-to-one basis with the vertices of the lenticules 19 and have a geometric transmission of 25%; i.e., the input slots occupy 25% of the center-to-center spacing of the lenticules. It has been determined that for a 525 line scanning rate, the peak instantaneous modulated light efficiency for the horizontal slots 22 is 28.43% (including first, second and third order ray utilization), but for a 1023 line scanning standard, the peak efficiency decreases to 22.86% because the angle of diffraction corresponding to the second order ray utilization also corresponds to the angular spacing of the output bars (or input slots because they have a one-to-one relationship) which results in complete blockage of the second order rays.

A multiple light valve (MLV) projector apparatus for producing a color display includes two separate light valves of the Schlieren dark field type. One of the light valves produces a first primary color, e.g. green, and the other light valve produces two colors, e.g., red and blue. Referring again to FIGS. a and 2, there is shown a typical two color light valve projector apparatus which may incorporate the present invention. The apparatus includes, in sequence, a lamp 10 which provides white light to an elliptical reflector 12, a color filter plate 14, a first lenticular lens plate 16 having located on the surface remote from the lamp an array of first lenticules, or small lenses, 17 and an input pupil comprising a second lenticular lens plate 18, having located on the surface adjacent the lamp an array of second lenticules 19 and having located on the opposite surface an input mask 20. The prior input mask 20, shown in FIG. 2, includes a first region, or central portion, having a plurality of horizontally extending first slots 22 separated by opaque bats 24. A centrally disposed aperture 26 is provided therein for an electron gun 28, schematically shown by the dashed lines. A second region of the input mask 20 includes portions above and below the central portion. A plurality of vertically extending second slots 30 are formed in the second region and are separated by opaque bats 32. A section of the input mask 20 has been broken away to show that the second lenticules 19 of the second lenticular lens plate 18 are arranged in horizontally extending rows and vertically extending columns to form an array of lenslets. Five horizontal slots 22 are formed in the central portion and seven vertical slots 30 are formed in the portions above and below the central portion of the input mask 20. Both the horizontal slots 22 and the vertical slots 30 are arranged on a one-to-one basis with the vertices of the second lenticules 19. The slots 22 and 30 have a geometric transparency, or width, of 25% of the center-to-center spacing of the second lenticules 19. However, since the second lenticules 19 are substantially rectangular and have a 3-to-4 aspect ratio, the horizontal slots 22 are closer together and narrower than the vertical slots 30 by the 3-to-4 ratio.

The second lenticular lens plate 18 forms a portion of the envelope of a sealed light valve 34 which includes therein the electron gun 28, the input mask 20, deflection plates 36, a rotating disk 38, and a fluid reservoir 40. A control oil layer is provided on the rotating disk 38 as it rotates through the sump or reservoir 40 and information is written on a control layer raster plane 42 by an electron beam (not shown) from the electron gun 28. A Schlieren-projection lens 44, including a Schlieren lens 46, the output color-selection mask 48 and a projection lens 50, is secured to the end of the light valve 34 opposite the electron gun 28. The output mask 48 is the complement of the input mask 20. That is, in the output mask 48 the horizontal and vertical slots (shown schematically in FIG. 1) are aligned with the horizontal and vertical opaque bars 24 and 32, respectively, of the input mask 20, and the horizontal and vertical slots of the output mask 48 are aligned with the horizontal and vertical slots 22 and 30, respectively, of the input mask. Of course, there is no central aperture in the output mask 48. Thus, if the control layer is undisturbed, i.e., no information is written thereon, the bars of the output mask 48 block the light transmitted through the slots 22 and 30 of the input mask 20 and there is no light output from the light valve projector. This is a basic characteristic of a light valve projector of the Schlieren dark field type.

The embodiment of the two-color light valve projector shown in FIGS. 1 and 2 uses orthogonal diffraction axes and appropriate spatial filtering to achieve independent control of pixel color and intensity. The input pupil of the light valve 34 is split up chromatically and by spatial filtering such that red light chromatically and by spatial filtering such that red light from the filter plate 14 passes through the horizontal slots 22 and blue light from the filter plate 14 passes through the vertical slots 30. A high frequency carrier, e.g., 48 and 96 MHz at a 525 line scan rate, and 96 MHz only, at a 1023 line scan rate, is applied to the vertical elements of the deflection plates 36 and is modulated by the red video signal. The electron beam writes a modulated raster or first diffraction grating on the control layer raster plane 42. A second diffraction grating is created orthogonal to the first grating by velocity modulating the electron beam in the horizontal direction by applying a harmonically related carrier signal, e.g., a subharmonic such as 12 MHz at the 525 line scan rate and 24 MHz at the 1023 line scan rate, to the horizontal plates and modulating it with the blue video signal. The first diffraction grating on the control layer raster plane 42 diffracts the red light vertically so that it passes through the complimentary horizontal slots formed in the output mask 48 while the second diffraction pattern on the control layer raster plane 42 diffracts the blue light horizontally through the complementary vertical slots in the output mask.

SUMMARY OF THE INVENTION

A light valve projector apparatus includes a two color light valve of the Schlieren dark field type having an input mask and a complementary output mask. The two color light valve has an optical pupil which comprises a plurality of lenticules arranged in a first and a second direction to form an array of lenslets. The input mask has slots in one region which extend in the first direction and slots in the second region which extend in the second direction. The slots in each of the regions are separated by opaque bars. Light filtering means is provided for passing a first color through the slots in the one region and a second color through the slots in the second region. The input mask is improved over prior input masks by locating the slots in the first region asymmetrically with respect to the lenticules which are arranged in the first direction. The effect of the improvement is to substantially increase the light output of the first color.

DETAILED DESCRIPTION OF THE PREFERRED EMBODIMENT

Figure 1:
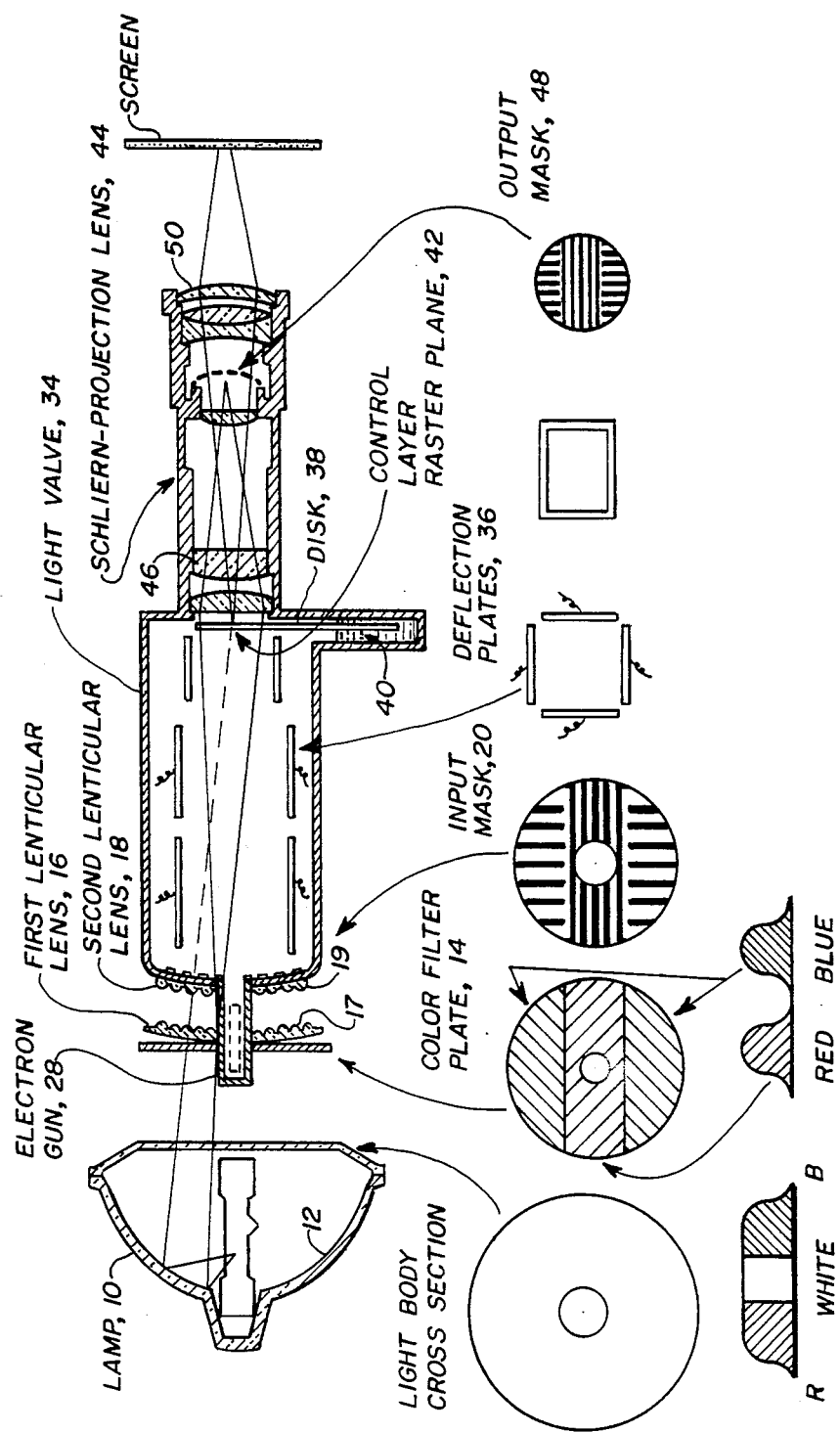
FIG. 1 is a simplified schematic view of a typical prior art light valve system which includes input and output masks.
Figure 2:
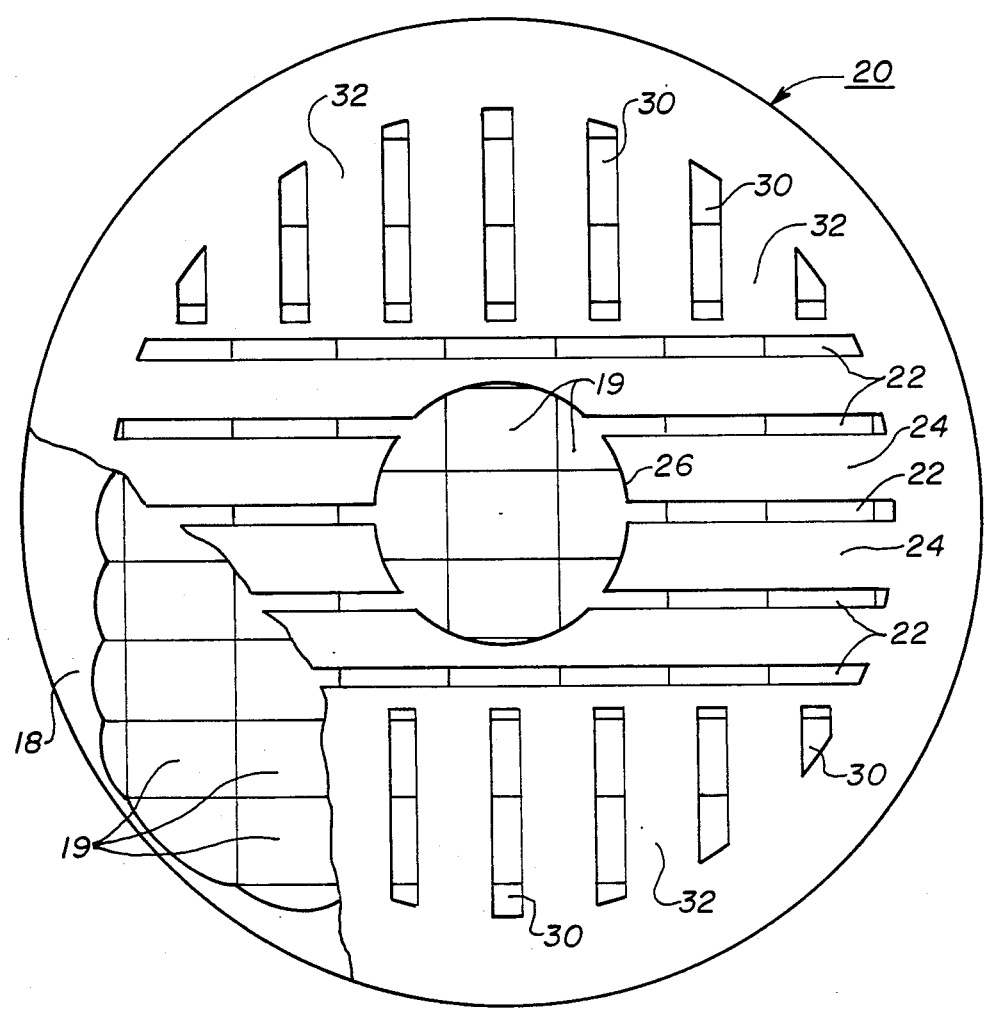
FIG. 2 is an enlarged view of a conventional input mask that is partially broken away to reveal the lenslets of the lenticular lens system.

As previously described, with reference to FIGS. 1 and 2 the two color light valve of the MLV projector apparatus is conventional. The light output of the apparatus is limited by the red light output of the two color light valve and more specifically by the configuration of the input mask 20 and the complementary output mask 48.

The input mask 20 has a geometric transmission of 25% and an actual input transmission of 43%. The actual transmission is higher than the geometric transmission because each of the five horizontal slot is centered on the vertices of a row of first lenticules 19

Figure 3:
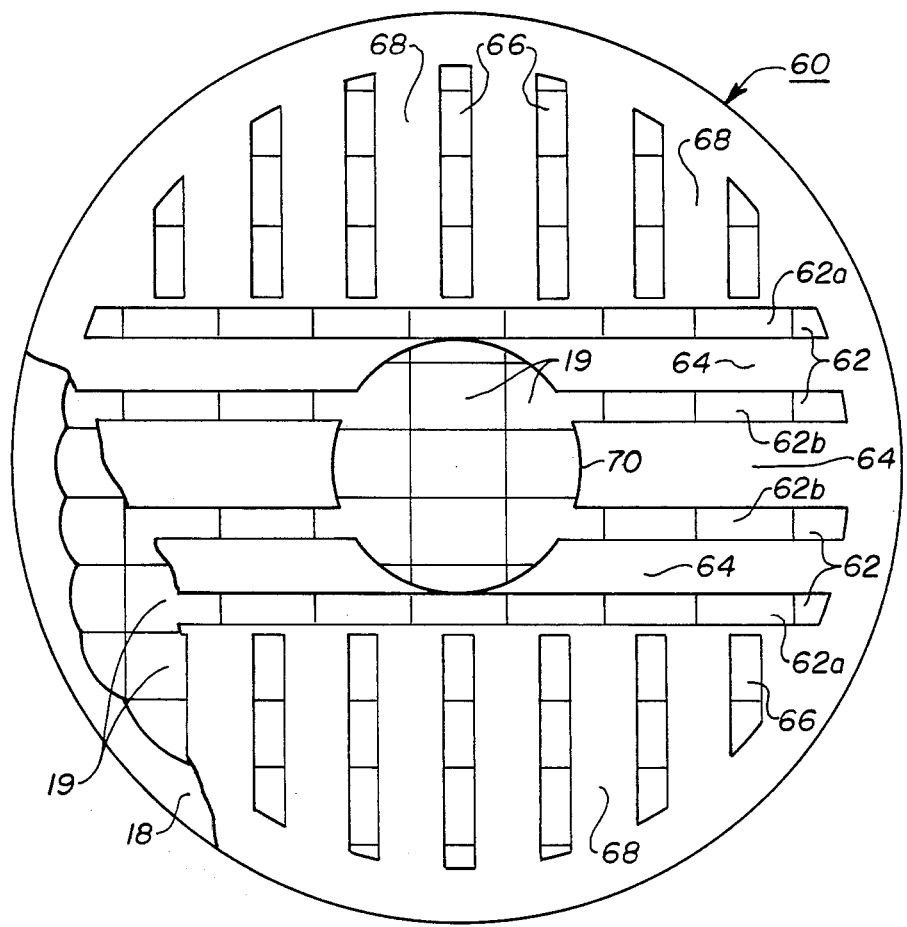
FIG. 3 is an enlarged view of an improved input mask that is partially broken away to reveal the lenslets of the lenticular lens system.
Figure 4:
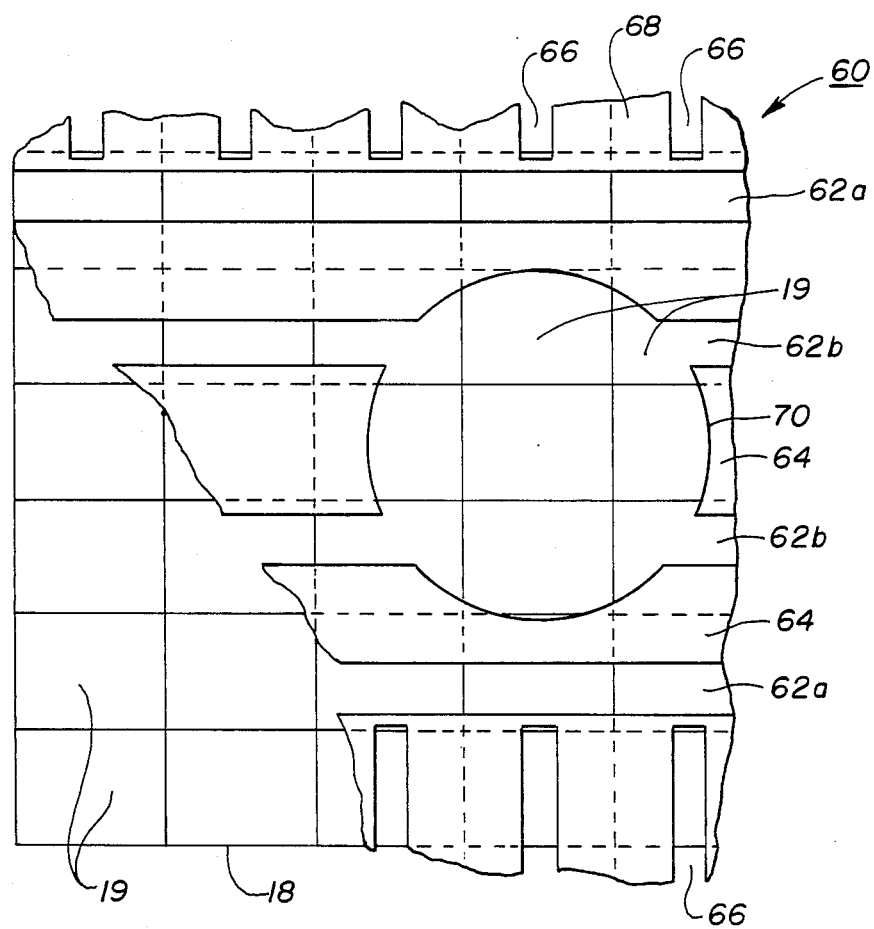
FIG. 4 is a fragmentary enlarged view of the input mask configuration of FIG. 3.

With respect to FIG. 3. the novel input mask 60 is partially removed to show the second lenticular lens plate 18 and the second lenticular 19 which are arranged in horizontal rows and vertical columns. The lens plate 18 and second lenticules 19 are conventional and, as described previously the lenticules 19 have a 3-to-4 aspect ratio. The horizontal slots 62 of the input mask 60 have a geometric transmission of 50%. i.e.. the width of each of the horizontal slots is 50% of the center-to-center distance between adjacent rows of lenticules 19. Simply stated, the width of each horizontal slot 62 is 50% of the minor dimension of the lenticule 19. FIG. 4 shows a portion of the input mask 60 and the second lenticular lens plate 18 with the lenticules 19 shown in phantom by dashed lines where they lie behind opaque portions of the input mask. The horizontal slots 62 are asymmetrically disposed relative to the rows of lenticules 19 in the lenticular array. The two outer horizontal rows 62a are formed outwardly by 12.5% of the center-to-center distance between adjacent rows of lenticules. The two inner horizontal rows 62b are formed inwardly by 12.5% and are disposed toward one another. Opaque bars 64 separate the adjacent horizontal slots 62. The bar 64 separating the two inner horizontal slots 62b is wider than the opaque bars 64 separating the outer and inner horizontal slots 62a and 62b, respectively. As shown more clearly in FIG. 4, the center bar 64 totally obscures the center row of lenticules. A total of five rows of lenticules 19 are associated with the central portion of the mask 60.

The portions of the input mask 60 located above and below the central portion have seven vertical slots 66 formed therein which are separated by opaque bars 68. The vertical slots 66 are symmetrically disposed i.e. centered, with respect to the vertices of the associated therewith, and the rows of lenticules focus a portion of the incident light through the corresponding horizontal slots 22. TABLE I lists the diffraction order utilization for the first, second and third orders and the percentage of peak efficiency for line scan standards of 525 lines and 1023 lines for the five horizontal slots of the input mask 20 which pass red light.

TABLE I

| | Five Horizontal Slots Order Utilization | |
|---|---|---|
| | 525 lines | 1023 lines |
| 1st order | 57.35% | 76.47% |
| 2nd order | 76.47% | 0% |
| 3rd order | 76.47% | 58.82% |
| peak efficiency | 28.43% | 22.86% |

The configuration of the input mask 20 is such that the red light output at a high resolution of 1023 lines has lower efficiency than at a standard resolution of 525 lines because the second diffraction order is completely blocked and the transmission of the third diffraction order is substantially reduced.

FIGS. 3 and 4 show a novel input mask 60 of an improved configuration which provides substantially higher red light output through four horizontal slots 62 formed in the central portion of the mask. While fewer horizontal slots are provided in the central portion of the novel input mask 60 than in the conventional input mask 20, the input mask 60 optimizes the utilization of the first three diffraction orders for the 525 and the 1023 line scanning standards.

With respect to FIG. 3, the novel input mask 60 is partially removed to show the second lenticular lens plate 18 and the second lenticular 19 which are arranged in horizontal rows and vertical columns, The lens plate 18 and second lenticules 19 are conventional and, as described previously, the lenticules 19 have a 3-to -4 aspect ratio. The horizontal slots 62 of the input mask 60 have a geometric transmission of 50%, i.e., the width of each of the horizontal slots is 50% of the center-to-center distance between adjacent rows of lenticules 19. Simply stated, the width of each horizontal slot 62 is 50% of the minor dimension of the lenticule 19. FIG. 4 shows a portion of the input mask lenticules 19 shown in phantom by dashed lines where they lie behind opaque portions of the input mask. The horizontal slots 62 are asymmetrically disposed relative to the rows of lenticules 19 in the lenticular array. The two outer horizontal rows 62a are formed outwardly by 12.5% of the center-to-center distances betwen adjacent rows of lenticules. The two inner horizontal rows 62b are formed inwardly by 12.5% and are disposed toward one another. Opaque bars 64 separate the adjacent horizontal slots 62. The bar 64 separating the two inner horizontal slots 62b is wider than the opaque bars 64 separating the outer and inner horizontal slots 62a and 62b, respectively. As shown more clearly in FIG. 4, the center bar 64 totally obscures the center row of lenticules. A total of five rows of lenticules 19 are associated with the central portion of the mask 60.

The portions of the input mask 60 located above and below the central portion have seven vertical slots 66 formed therein which are separated by opaque bars 68. The vertical slots 66 are symmetrically disposed, i.e., centered, with respect to the vertices of the lenticular 19. The vertical slots 66 are substantially orthogonal to the horizontal slots 62. The geometric transmission of the vertical slots 66 has been increased from 25% in the prior mask 20 to 29% of the center-to-center lenticule spacing, i.e. along the major dimension of the lenticule 19 in the present mask 60. A central aperture 70 is provided to accommodate the electron gun (not shown). The doubling of the geometric transmission of the horizontal slots 62 to 50% in combination with the asymmetrical positioning of the slots 62 relative to the vertices of the rows of lenticules and the obscuring of the center row of lenticules provided an actual input transmission 55.59% and produces the unexpected result of increasing the peak efficiency of red light through the four slots 62 for both the 525 line scanning standard and the 1023 line standard. The results are provided in TABLE II.

TABLE II

| | Four Horizontal Slots Order Utilization | |
|---|---|---|
| | 525 lines | 1023 lines |
| 1st order | 28.57% | 60.70% |
| 2nd order | 71.43% | 46.40% |
| 3rd order | 61.40% | 19.57% |
| Peak efficiency | 28.95% | 29.52% |

At the high resolution line scanning standard of 1023 lines, the increase in red light efficiency of the novel input mask 60 to 29.52% from 22.86% for the conventional input mask 20 shows an improvement of at least 30% in red light ouput. The blue light output of the input mask 60 is also improved over the conventional input mask 20 by about 14% because of the increase in the geometric slot width of the vertical slots 66. The output mask (not shown) is a complement of the input mask except that there is no central aperture in the output mask.

While the two color light valve was described for red and blue light, the invention is not limited to these colors and any complementary colors can be utilized depending upon the characteristics of the color filter plate.

What is claimed is:

1. In a light valve projector apparatus including a two color light valve of the Schlieren dark field type having an input mask and a complementary output mask wherein an optical pupil for the two color light valve comprises:

a plurality of lenticules arranged in a first and a second direction to form an array of lenslets;

said input mask having a plurality of first slots in one region extending in said first direction and a plurality of second slots in a second region extending in said second direction said slots in each of said regions being separated by opaque bars; and light filtering means for passing a first color through said first slots in said one region and a second color through said second slots in said second region, wherein the improvement comprises said first slots in said first region of said input mask being asymmetrically disposed with respect to said lenticles arranged in said first direction, whereby the light output of said first color is increased substantially.

2. The apparatus as described in claim 1, wherein each of said first slots in said first region has a geometric width greater than the geometric width of said second slots in said second region.

3. The apparatus as described in claim 1, wherein said first region comprises a horizontally extending central portion of said input mask.

4. The apparatus as described in claim 3, wherein said second region comprises the portions above and below said central portion of said input mask.

5. The apparatus as described in claim 4, wherein said slots in said portions above and below said central portion are substantially orthogonal to said slots in said central portion.

6. The apparatus as described in claim 5, wherein said slots in said portions above and below said central portion are symmetrically disposed with respect to the columns of lenticules arranged in said second direction and have a width comprising about 29 percent of the center-to-center horizontal spacing between adjacent columns of lenticules.

7. The apparatus as described in claim 3, wherein four slots are formed in said central portion of said mask, the two outer slots being asymmetrically disposed toward the adjacent portion of the second region and the two inner slots being asymmetrically disposed toward each other.

8. The apparatus as described in claim 7, wherein five rows of lenticules are associated with said horizontally extending central portion of said input mask, the center row of lenticules being blocked by an opaque bar separating said two inner slots.

9. The apparatus as described in claim 8, wherein each of the adjacent inner and outer slots is asymmetrically displaced by about 12.5 percent with respect to the center-to-center vertical spacing between adjacent rows of lenticules.

10. The apparatus as described in claim 9, wherein the width of each slot comprises about 50 percent of the center-to-center vertical spacing between adjacent rows of lenticules.

11. In a light valve projection apparatus wherein an image to be displayed in color is formed by the addition of light from two separate light valves of the Schlieren dark field type a first light valve producing red and blue light and a second light valve producing green light, said first light valve having an input mask and a complementary output mask wherein an optical pupil for said first light valve comprises:
a plurality of lenticules arranged in rows and columns to form an array of lenslets;
said input mask having a plurality of first slots in a horizontally extending central portion, said first slots extending in the direction of the rows of lenticules and a plurality of second slots in the portions above and below the central portion, said second slots extending in the direction of the columns of lenticules, said slots in the central portion and in the portions above and below the central portion being separated by opaque bars; and
light filtering means for passing red light through the slots in the central portion and blue light through the slots in the portions above and below the central wherein the improvement comprises:
said first slots in the central portion being asymmetrically disposed with respect to the lenticules arranged in rows, each of said first slots in the central portion having a geometric width greater than that of said second slots in the portions above and below the central portion whereby the output of red light is increased substantially from the first light valve.

12. The apparatus as described in claim 11, wherein said plurality of first slots comprise four horizontally disposed slots formed in said central portion of said mask, one of the outer slots adjacent to the portion above the central portion being asymmetrically disposed outwardly toward the portion above, the other outer slot being asymmetrically disposed outwardly toward the portion below the central portion, and the two inner slots being asymmetrically disposed inwardly toward one another.

13. The apparatus as described in claim 12, wherein five rows of lenticules are associated with said horizontally extending central portion of said input mask, the center row of lenticules being blocked by an opaque bar separating said two inner slots.

14. The apparatus as described in claim 13, wherein each of said adjacent inner and outer slots is asymmetrically displaced by about 12.5 percent with respect to the center-to-center vertical spacing between adjacent rows of lenticules.

15. The apparatus as described in claim 14, wherein the width of each first slot comprises about 50 percent of the center-to-center vertical spacing between adjacent rows of lenticules.

16. The apparatus as described in claim 15, wherein said second slots in said portions above and below said central portion are symmetrically disposed with respect to the columns of lenticules and have a width comprising about 29 percent of the center-to-center horizontal spacing between adjacent columns of lenticules.

* * * * *

UNITED STATES PATENT AND TRADEMARK OFFICE
CERTIFICATE OF CORRECTION

PATENT NO. : 4,789,221
DATED : 12/6/88
INVENTOR(S) : Thomas T. True

It is certified that error appears in the above-identified patent and that said Letters Patent is hereby corrected as shown below:

```
Column 6, line 56, insert -- , -- after "direction".
Column 7, line 43, insert -- , -- after "type".
Column 8, line 11, insert --portion,-- before "wherein".
Column 8, line 17, insert -- , -- after "portion".
```

Signed and Sealed this

Twenty-fourth Day of October, 1989

*Attest:*

DONALD J. QUIGG

*Attesting Officer*  *Commissioner of Patents and Trademarks*